United States Patent [19]

Yoshida et al.

[11] Patent Number: 5,772,973
[45] Date of Patent: Jun. 30, 1998

[54] EXHAUST GAS CLEANER AND METHOD FOR REMOVING NITROGEN OXIDES

[75] Inventors: Kiyohide Yoshida; Akira Abe, both of Kumagaya; Tatsuo Miyadera, Tsukuba; Naoko Irite, Kumagaya, all of Japan

[73] Assignees: Kabushiki Kaisha Riken; Hiroshi Kashiwagi of Director-General of Agency of Industrial Science and Technology, both of Tokyo, Japan

[21] Appl. No.: 805,234

[22] Filed: Feb. 24, 1997

Related U.S. Application Data

[63] Continuation of Ser. No. 601,495, Feb. 14, 1996, Pat. No. 5,656,249, which is a continuation of Ser. No. 288,253, Aug. 11, 1994, abandoned, which is a continuation-in-part of Ser. No. 170,736, Dec. 21, 1993, abandoned.

[30] Foreign Application Priority Data

| Dec. 28, 1992 | [JP] | Japan | 4-360035 |
| Dec. 28, 1992 | [JP] | Japan | 4-360039 |
| Mar. 10, 1993 | [JP] | Japan | 5-76294 |
| May 21, 1993 | [JP] | Japan | 5-142689 |

[51] Int. Cl.$^6$ .................................................. B01J 23/00
[52] U.S. Cl. ................................. 423/239.1; 423/213.2
[58] Field of Search ........................... 423/239.1, 213.2

[56] References Cited

U.S. PATENT DOCUMENTS

| 3,454,355 | 7/1969 | Ryason . |
| 3,857,921 | 12/1974 | Tamura et al. . |
| 4,016,241 | 4/1977 | Nishikawa et al. . |
| 5,106,802 | 4/1992 | Horiuchi et al. . |
| 5,208,202 | 5/1993 | Muramatsu et al. . |
| 5,250,489 | 10/1993 | Dalla Bett et al. . |
| 5,336,651 | 8/1994 | Yoshimoto et al. . |
| 5,534,237 | 7/1996 | Yoshida et al. . |

FOREIGN PATENT DOCUMENTS

| 0475173 | 3/1992 | European Pat. Off. . |
| 4128629 | 3/1993 | Germany . |
| 63-100919 | 5/1988 | Japan . |
| 63-283727 | 11/1988 | Japan . |
| 1130735 | 5/1989 | Japan . |
| 4281844 | 10/1992 | Japan . |
| 0526099 | 2/1993 | Japan . |
| 2248194 | 4/1992 | United Kingdom . |

OTHER PUBLICATIONS

Hawley, The Condensed Chemical Dictionary, 1981, p. 777.

*Primary Examiner*—Steven Bos
*Assistant Examiner*—Thomas G. Dunn
*Attorney, Agent, or Firm*—Browdy and Neimark

[57] ABSTRACT

Nitrogen oxides are removed from an exhaust gas containing nitrogen oxides and oxygen in an amount larger than its stoichiometric amount relative to unburned components in the exhaust gas, by (i) disposing an exhaust gas cleaner in a flow path of the exhaust gas, the exhaust gas cleaner comprising 0.2–15 weight % (on a metal basis) of fine silver or silver oxides having an average diameter of 10–1,000 nm and supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C., thereby causing a reaction of nitrogen oxides with the hydrocarbons and/or oxygen-containing organic compounds.

3 Claims, 1 Drawing Sheet

EXHAUST GAS CLEANER AND METHOD FOR REMOVING NITROGEN OXIDES

CROSS-REFERENCE TO RELATED APPLICATION

This application is a continuation of parent application Ser. No. 601,495 filed Feb. 14, 1996, now U.S. Pat. No. 5,656,249 which in turn is a continuation of application Ser. No. 08/288,253 filed Aug. 11, 1994, now abandoned, which in turn is a continuation-in-part of application U.S. Ser. No. 08/170,736, filed Dec. 21, 1993, now abandoned.

BACKGROUND OF THE INVENTION

The present invention relates to an exhaust gas cleaner for effectively removing nitrogen oxides from an exhaust gas containing nitrogen oxides and an excess amount of oxygen, and a method for removing nitrogen oxides with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" means nitrogen monoxide and/or nitrogen dioxide.

The nitrogen oxides are one of causes of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced.

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There have been proposed methods of reducing nitrogen oxides by adding to an exhaust gas hydrocarbons in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 60th Fall Conference of the Japan Chemical Society; and "Catalyst", Vol. 33, No. 2, p.59 (1991)). A catalyst carrying silver has been also proposed (Japanese Patent Laid-Open No. 4-281844).

However, these methods are effective only in a narrow temperature range of NOx removal. Also, their efficiency of removing nitrogen oxides is extremely low in the case of an actual exhaust gas because it contains about 10% of moisture.

OBJECT AND SUMMARY OF THE INVENTION

Accordingly, an object of the present invention is to provide an exhaust gas cleaner and a method capable of efficiently removing nitrogen oxides from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

As a result of intense research in view of the above objects, the inventors have found that nitrogen oxides are effectively removed even from an exhaust gas containing about 10% of moisture with improved efficiency in the presence of an exhaust gas cleaner comprising a silver component such as fine silver or silver oxides having a small average diameter, silver sulfate, a combination of silver and sulfuric acid, or silver chloride supported on a porous inorganic oxide, and by adding hydrocarbons and/or oxygen-containing organic compounds to the exhaust gas which is to be brought into contact with the above exhaust gas cleaner at a particular temperature. The present invention has been completed based on this finding.

Thus, the first exhaust gas cleaner for removing nitrogen oxides from an exhaust gas containing nitrogen oxides and oxygen in an amount larger than its stoichiometric amount relative to unburned components in the exhaust gas according to the present invention comprises 0.2–15 weight % (on a metal basis) of fine silver or silver oxides supported on a porous inorganic oxide, wherein the fine silver or silver oxides have an average diameter of 10–1,000 nm.

The first method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising 0.2–15 weight % (on a metal basis) of fine silver or silver oxides having an average diameter of 10–1,000 nm and supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C., thereby causing a reaction of nitrogen oxides with the hydrocarbons and/or the oxygen-containing organic compounds to remove the nitrogen oxides.

The second exhaust gas cleaner for removing nitrogen oxides from an exhaust gas containing nitrogen oxides and oxygen in an amount larger than its stoichiometric amount relative to unburned components in the exhaust gas according to the present invention comprises 0.2–15 weight % (on a metal basis) of silver sulfate or a combination of 0.2–15 weight % of silver and sulfuric acid at a mole ratio of 1/50 to 2 relative to the silver supported on a porous inorganic oxide.

The second method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising 0.2–15 weight % (on a metal basis) of silver sulfate or a combination of 0.2–15 weight % of silver and sulfuric acid at a mole ratio of 1/50 to 2 relative to the silver supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C., thereby causing a reaction of nitrogen oxides with the hydrocarbons and/or oxygen-containing organic compounds to remove the nitrogen oxides.

The third exhaust gas cleaner for removing nitrogen oxides from an exhaust gas containing nitrogen oxides and oxygen in an amount larger than its stoichiometric amount relative to unburned components in the exhaust gas according to the present invention comprises 0.2–15 weight % (on a metal basis) of silver chloride supported on a porous inorganic oxide.

The third method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising 0.2–15 weight % (on a metal basis) of silver chloride supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C., thereby causing a reaction of nitrogen oxides with the hydrocarbons and/or the oxygen-containing organic compounds to remove the nitrogen oxides.

DETAILED DESCRIPTION OF THE INVENTION

Figure 1:
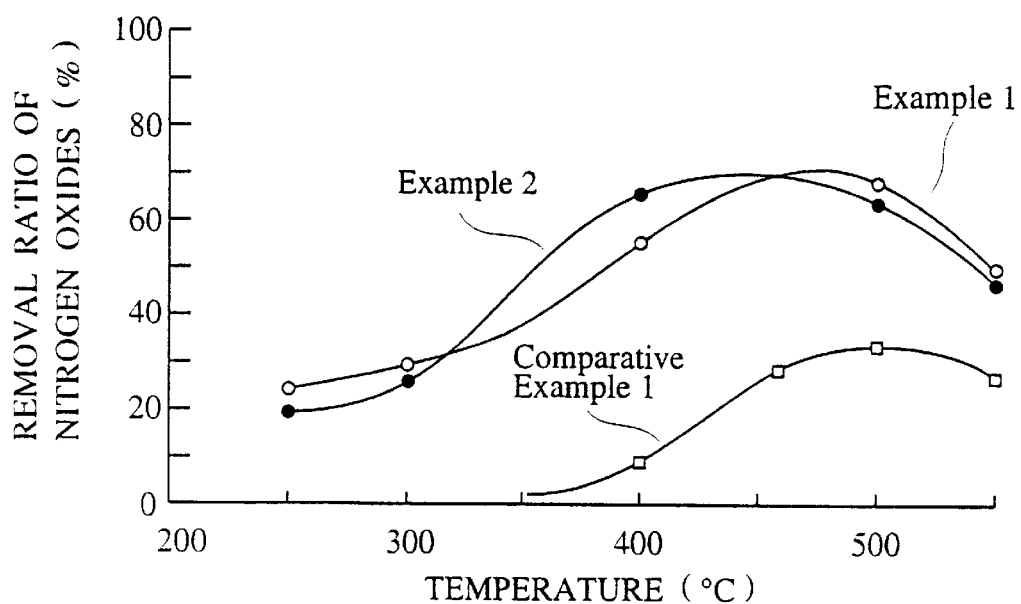
FIG. 1 is a graph showing the relation between the removal ratio of nitrogen oxides and the temperature of the exhaust gas in Example 1 and 2, and Comparative Example 1.

The present invention provides exhaust gas cleaners comprising the following types of catalytically active components and the corresponding methods for removing nitrogen oxides:

[A] First type of exhaust gas cleaner

Catalytically active component: silver or silver oxides having an average diameter of 10–1,000 nm,

[B] Second type of exhaust gas cleaner

Catalytically active component: silver sulfate or a combination of silver and sulfuric acid, and

[C] Third type of exhaust gas cleaner

Catalytically active component: silver chloride.

The nitrogen oxides are removed from an exhaust gas by bringing the exhaust gas into contact with the above exhaust gas cleaner, and by using hydrocarbons remaining in the exhaust gas and/or hydrocarbons and/or oxygen-containing organic compounds added to the exhaust gas on the upstream side of the exhaust gas cleaner as reducing agents.

Each exhaust gas cleaner may be basically in two structures; one in which each of one or more catalysts is composed of a catalytically active component carried by porous inorganic oxide powder, which is in turn supported on an exhaust gas cleaner substrate, and the other in which each of one or more catalysts is composed of a catalytically active component directly carried by a porous inorganic oxide body.

In the former exhaust gas cleaner, the catalysts comprising catalytically active components supported on a porous inorganic oxide powder are coated onto a heat-resistant exhaust gas cleaner substrate. Preferable materials for the exhaust gas cleaner substrate include porous, heat-resistant ceramics such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the exhaust gas cleaner substrate may be formed from a known metal material. The shape and size of the exhaust gas cleaner substrate may be changed depending on applications. The exhaust gas cleaner substrate may be in the form of a three-dimensional structure such as a honeycomb, a foam, a refractory fiber assembly, etc.

In the latter exhaust gas cleaner, the catalytically active components are supported directly by porous inorganic oxide bodies in the form of pellets or granules, and they are charged into a proper reactor such as a catalytic converter.

[A] First Type of Exhaust Gas Cleaner and Method of Removing NOx by Using Such Exhaust Gas Cleaner The first type of exhaust gas cleaner comprises 0.2–15 weight % (on a metal basis) of fine silver or silver oxides supported on a porous inorganic oxide, wherein the fine silver or silver oxides have an average diameter of 10–1,000 nm.

[1] First catalytically active component

The first type of exhaust gas cleaner of the present invention comprises a first catalytically active component supported on a porous inorganic oxide (powder or molding). Preferable materials for the porous inorganic oxide include ceramics such as alumina, silica, titania, zirconia and their composite oxides, etc. Particularly preferable materials for the porous inorganic oxide are γ-alumina or its composite oxide such as γ-alumina-titania, γ-alumina-silica, γ-alumina-zirconia, etc. With γ-alumina or its composite oxides, the hydrocarbons remaining in the exhaust gas and/or the hydrocarbons and/or oxygen-containing organic compounds added to the exhaust gas are efficiently allowed to react with the nitrogen oxides in the exhaust gas.

A specific surface area of the porous inorganic oxide is preferably 10 $m^2/g$ or more. When the specific surface area is smaller than 10 $m^2/g$, the silver component (catalytically active component) is not well dispersed over the porous inorganic oxide, failing to remove nitrogen oxides efficiently. A specific surface area of the porous inorganic oxide is more preferably 30 $m^2/g$ or more.

In a case where a three-dimensional structure (honeycomb, foam, etc.) made of ceramics or metal is used, it is coated with fine silver or silver oxides supported on fine porous inorganic oxide powder, or the three-dimensional structure is coated with fine porous inorganic oxide powder and then impregnated with a silver compound to form fine silver or silver oxides. Cordierite, mullite, etc. which have excellent heat resistance may be used as a ceramic material. The porous inorganic oxide powder may be coated on the three-dimensional structure by a known wash-coating method, etc.

Alternatively, fine silver or silver oxides may be supported on a porous inorganic oxide body in the form of pellet or granule.

In any, the amount of fine silver or silver oxides is 0.2–15 weight % (on a metal basis) based on the porous inorganic oxide. When the amount of fine silver or silver oxides is less than 0.2 weight % (on a metal basis), a removal ratio of nitrogen oxides is low at a low temperature. When the amount of fine silver or silver oxides is more than 15 weight % (on a metal basis), hydrocarbons and/or oxygen-containing organic compounds are likely to be burned, resulting in decrease in the removal ratio of nitrogen oxides. The preferred amount of silver component is 0.5–10 weight % (on a metal basis) based on the porous inorganic oxide.

Fine silver or silver oxides supported on a porous inorganic oxide have an average diameter of 10–1,000 nm. The smaller the diameter of fine silver or silver oxides, the more catalytically active the fine silver or silver oxides. However, when the average diameter of fine silver or silver oxides is less than 10 nm, hydrocarbons and/or oxygen-containing organic compounds are likely to be predominantly burned, resulting in a decrease in the removal ratio of nitrogen oxides. On the other hand, when the average diameter of fine silver or silver oxides is more than 1,000 nm, the silver component is less active, resulting in a decrease in the removal ratio of nitrogen oxides. Particularly, when hydrocarbons are added, the average diameter of fine silver or silver oxides is preferably 20–100 nm, more preferably 30–80 nm. When oxygen-containing organic compounds are added, the average diameter of fine silver or silver oxides is preferably 20–200 nm. Incidentally, the term "average" means an arithmetic average. The fine silver component particles may exist in the form of a metal or oxides at the exhaust gas temperature.

The silver component may be carried by the porous inorganic oxide by known methods such as an impregnation method, a precipitation method, a sol-gel method, etc. In the case of the impregnation method, the porous inorganic oxide is impregnated with an aqueous solution of silver nitrate, etc., dried at 50°–150° C., and heated at a temperature elevating stepwise from 100° C. to 600° C. in an air stream, in a nitrogen or hydrogen stream or in vacuum. The particle size of the silver component can be controlled by burning at 600° C. for 1 hour or more in an oxidizing atmosphere. When the heating is conducted at a temperature higher than 600° C., the burning time is preferably shortened. For instance, in the case of burning at 700° C., the burning time is preferably within 3 hours. In this case, better results can be obtained in the presence of nitrogen oxide during burning operations. Thus, the exhaust gas cleaner burned in a nitrogen or hydrogen stream is subjected to a final oxidation treatment at 700° C. or lower, particularly at 550° C.

[2] Method for Removing NOx

The above-mentioned exhaust gas cleaner is disposed in a flow path of the exhaust gas, and hydrocarbons and/or oxygen-containing organic compounds are introduced into the exhaust gas on the upstream side of the exhaust gas cleaner.

The exhaust gas usually contains as remaining hydrocarbons acetylene, methane, ethane and propylene, etc. Since the exhaust gas does not usually contain a sufficient amount of residual hydrocarbon to reduce whole nitrogen oxides in the exhaust gas, hydrocarbons and/or oxygen-containing organic compounds should be introduced into the exhaust gas.

The hydrocarbons which are introduced into the exhaust gas may be gaseous or liquid under standard conditions. The gaseous hydrocarbons may be alkanes, alkenes or alkynes having 2 or more carbon atoms, such as propane, propylene, acetylene, etc., and the liquid hydrocarbons may be diesel oil, cetane, heptane, kerosene, etc. The preferred oxygen-containing organic compounds are alcohols having 2 or more carbon atoms such as ethanol, butanol, etc. These hydrocarbons and/or oxygen-containing organic compounds can be introduced into the exhaust gas by a spray method, etc.

A weight ratio of the hydrocarbons and/or the oxygen-containing organic compounds introduced into the exhaust gas to nitrogen oxide (NO) existing in the exhaust gas is preferably 5 or less, more preferably 0.1–5. Even if the weight ratio is more than 5, the removal ratio of nitrogen oxides would not increase correspondingly, resulting in economic disadvantages. The weight ratio is most preferably 0.2 to 4.

The reaction of the nitrogen oxides with the hydrocarbons and/or the oxygen-containing organic compounds is efficiently carried out by controlling a catalyst ratio which means a ratio of the amount of the above-mentioned catalyst to the amount of the exhaust gas per a unit time (catalyst amount/(exhaust gas amount/unit time)). From a practical point of view, the catalyst ratio of the above-mentioned catalyst with the exhaust gas to which the hydrocarbons and/or the oxygen-containing organic compounds are added is 0.006 sec·g/ml or more. The preferred catalyst ratio is 0.007 sec·g/ml or more.

The exhaust gas passing through the exhaust gas cleaner in which the hydrocarbons and/or the oxygen-containing organic compounds are allowed to react with the nitrogen oxides is kept at a temperature of 200°–600° C. When the temperature of the exhaust gas is lower than 200° C., a reduction of the nitrogen oxides cannot be sufficiently carried out. On the other hand, when the temperature of the exhaust gas is higher than 600° C., the hydrocarbons and/or the oxygen-containing organic compounds are burned, failing to reduce the nitrogen oxides effectively. The preferred temperature of the exhaust gas is 300°–550° C.

[B] Second Type of Exhaust Gas Cleaner and Method of Removing NOx by Using Such Exhaust Gas Cleaner The second type of exhaust gas cleaner comprises 0.2–15 weight % (on a metal basis) of silver sulfate or a combination of 0.2–15 weight % of silver and sulfuric acid at a mole ratio of 1/50 to 2 relative to silver supported on a porous inorganic oxide.

[1] Second Catalytically Active Component

The second catalytically active component supported on a porous inorganic oxide is silver sulfate or a combination of silver and sulfuric acid. The materials for the porous inorganic oxide may be the same as in the first type of the exhaust gas cleaner.

In a case where silver sulfate is supported on a porous inorganic oxide, the amount of silver sulfate is 0.2–15 weight % (on a metal basis) based on the porous inorganic oxide (100 weight %). When the amount of silver sulfate is less than 0.2 weight % (on a metal basis), a removal ratio of nitrogen oxides is low at a low temperature. On the other hand, when the amount of silver sulfate is more than 15 weight % (on a metal basis), hydrocarbons are likely to be burned, resulting in decrease in the removal ratio of nitrogen oxides. The preferred amount of silver sulfate is 0.5–10 weight % (on a metal basis) based on the porous inorganic oxide.

In a case where silver and sulfuric acid are supported on a porous inorganic oxide, the amount of the silver component is 0.2–15 weight % (on a metal basis) based on the porous inorganic oxide. When the amount of the silver component is less than 0.2 weight % (on a metal basis), a removal ratio of nitrogen oxides is low at a low temperature. On the other hand, when the amount of the silver component is more than 15 weight % (on a metal basis), hydrocarbons are likely to be burned, resulting in decrease in the removal ratio of nitrogen oxides. The preferred amount of the silver component is 0.5–10 weight % (on a metal basis) based on the porous inorganic oxide. Silver and sulfuric acid may not be in an equimolar amount. The preferred mole ratio of sulfuric acid to silver is in the range of 1/50 to 2.

The silver component may be carried by the porous inorganic oxide by known methods such as an impregnation method, a precipitation method, a sol-gel method, etc. as in the first type of the exhaust gas cleaner. In the case of the impregnation method, the porous inorganic oxide is impregnated with an aqueous nitric acid solution of silver sulfate, etc., dried at 50°–150° C., and heated at a temperature elevating stepwise from 100° C. to 600° C. in an air stream, in a nitrogen or hydrogen stream or in vacuum. The exhaust gas cleaner burned in a nitrogen or hydrogen stream is subjected to a final oxidation treatment at 700° C. or lower, particularly at about 500° C., and better results can be obtained in the presence of nitrogen oxide during burning operations.

[2] Method for Removing NOx

The above-mentioned exhaust gas cleaner is disposed in a flow path of the exhaust gas, and hydrocarbons and/or oxygen-containing organic compounds are introduced into the exhaust gas on the upstream side of the exhaust gas cleaner.

The hydrocarbons and/or oxygen-containing organic compounds added in this method may be the same as in [A] [2]. A weight ratio of the hydrocarbons and/or the oxygen-containing organic compounds introduced into the exhaust gas to nitrogen oxides existing in the exhaust gas is preferably 5 or less, more preferably 0.1–5. Even if the weight ratio is more than 5, the removal ratio of nitrogen oxides would not increase correspondingly, resulting in economic disadvantages. The weight ratio is most preferably 0.2 to 4.

From a practical point of view, the catalyst ratio of the above-mentioned catalyst with the exhaust gas to which the hydrocarbons and/or the oxygen-containing organic compounds are added is 0.006 sec·g/ml or more, preferably 0.007 sec.g/ml or more.

The exhaust gas passing through the exhaust gas cleaner in which the hydrocarbons and/or the oxygen-containing organic compounds are reacted with the nitrogen oxides is kept at a temperature of 200°–600° C., preferably 300°–550° C.

[C] Third Type of Exhaust Gas Cleaner and Method of Removing NOx by Using Such Exhaust Gas Cleaner The third type of exhaust gas cleaner comprises 0.2–15 weight % (on a metal basis) of silver chloride supported on a porous inorganic oxide.

[1] Third Catalytically Active Component

The third catalytically active component supported on a porous inorganic oxide is silver chloride. The materials for the porous inorganic oxide may be the same as in the first type of the exhaust gas cleaner.

Silver chloride is supported on a porous inorganic oxide, the amount of silver chloride is 0.2–15 weight % (on a metal basis) based on the porous inorganic oxide (100 weight %). When the amount of silver chloride is less than 0.2 weight % (on a metal basis), a removal ratio of nitrogen oxides is low at a low temperature. When the amount of silver chloride is more than 15 weight % (on a metal basis), hydrocarbons are likely to be burned, resulting in decrease in the removal ratio of nitrogen oxides. The preferred amount of silver is 0.5–10 weight % (on a metal basis) based on the porous inorganic oxide.

The silver component may be carried by the porous inorganic oxide by known methods such as an impregnation method, a precipitation method, a sol-gel method, etc. as in the first type of the exhaust gas cleaner. In the case of the impregnation method, the porous inorganic oxide is impregnated with an aqueous solution of silver nitrate, etc., dried at 50°–150° C., immersed in an aqueous solution of ammonium chloride, and heated at a temperature elevating stepwise from 100° C. to 600° C. in an air stream, in a nitrogen or hydrogen stream or in vacuum. The exhaust gas cleaner burned in a nitrogen or hydrogen stream is subjected to a final oxidation treatment at 700° C. or lower., particularly at about 550° C., and better results can be obtained in the presence of nitrogen oxide during burning operations.

[2] Method for Removing NOx

The above-mentioned exhaust gas cleaner is disposed in a flow path of the exhaust gas, and hydrocarbons and/or oxygen-containing organic compounds are introduced into the exhaust gas on the upstream side of the exhaust gas cleaner.

The hydrocarbons and/or oxygen-containing organic compounds added in this method may be the same as in [A] [2]. Of the oxygen-containing organic compounds, an alcohol having two or more carbon atoms such as ethanol, propanol, etc. is preferred because an alcohol can give a considerably high removal ratio of nitrogen oxides over a wide temperature range. A weight ratio of the hydrocarbons and/or the oxygen-containing organic compounds introduced into the exhaust gas to nitrogen oxides existing in the exhaust gas is preferably 5 or less, more preferably 0.1–5. Even if the weight ratio is more than 5, the removal ratio of nitrogen oxides would not increase correspondingly, resulting in economic disadvantages. The weight ratio is most preferably 0.2 to 4.

From a practical point of view, the catalyst ratio of the above-mentioned catalyst with the exhaust gas to which the hydrocarbons and/or the oxygen-containing organic compounds are added is 0.006 sec·g/ml or more, preferably 0.007 sec·g/ml or more.

The exhaust gas passing through the exhaust gas cleaner in which the hydrocarbons and/or the oxygen-containing organic compounds are reacted with the nitrogen oxides is kept at a temperature of 200°–600° C., preferably 300°–550° C.

The present invention will be described in further detail by way of the following Examples. Incidentally, the catalytic active components are generally expressed by metals themselves for simplicity in Examples.

EXAMPLE 1

5 g of commercially available γ-alumina pellets (diameter: 1.5 mm, length: 6 mm, specific surface area: 200 m$^2$/g) were immersed in an aqueous solution of silver nitrate to carry 5 weight % (on a metal basis) of silver. Thereafter, they were dried at 80° C. for 2 hours, heated to 600° C. stepwise, and burned at 600° C. for 5 hours in an air stream to produce an exhaust gas cleaner comprising fine silver or silver oxides having an average diameter of 50 nm. Incidentally, the diameters of fine silver or silver oxides were measured by an electron microscope.

3.75 g of the resultant exhaust gas cleaner was set in a reactor pipe, and a test gas having a composition shown in Table 1 was caused to pass through the reactor pipe at a rate of 4.4 liters (standard conditions) per minute, which corresponded to a catalyst ratio of 0.05 sec·g/ml and a space velocity of 30,000 h$^{-1}$. The temperature of the test gas in the reactor pipe was changed from 250° C. to 550° C. to cause a reaction of nitrogen oxides with propylene.

The concentration of nitrogen oxides (sum of nitrogen monoxide and nitrogen dioxide) in the test gas after passing through the exhaust gas cleaner was measured by a chemiluminescence-based NO/NOx analyzer to determine the removal ratio of nitrogen oxides. The results are shown in FIG. 1.

TABLE 1

| Component | Concentration |
| --- | --- |
| Nitrogen monoxide | 800 ppm |
| Carbon monoxide | 100 ppm |
| Oxygen | 10 volume % |
| Propylene | 1714 ppm |
| Nitrogen | Balance |
| Water | 10 volume % based on the total of the above components. |

EXAMPLE 2

γ-Alumina powder (specific surface area: 200 m²/g) was immersed in an aqueous solution of silver nitrate to carry 3 weight % of silver, and 1.5 g of the resulting catalyst was supported on a commercially available honeycomb-type cordierite filter (diameter: 30 mm, length: 12.6 mm, 400 cells/in²) by a wash-coating method, dried at 80° C. for 2 hours, heated to 600° C. stepwise, and burned at 600° C. for 5 hours in an air stream to produce an exhaust gas cleaner comprising fine silver or silver oxides having an average diameter of 45 nm.

The resultant exhaust gas cleaner was set in a reactor pipe, and the same procedures as in Example 1 were conducted to measure the removal ratio of nitrogen oxides by using a test gas having a composition shown in Table 2. The results are shown in FIG. 1.

TABLE 2

| Component | Concentration |
| --- | --- |
| Nitrogen monoxide | 800 ppm |
| Carbon monoxide | 100 ppm |
| Oxygen | 10 volume % |
| Diesel oil | 3 times the weight of NO |
| Nitrogen | Balance |
| Water | 10 volume % based on the total of the above components. |

Comparative Example 1

The same γ-alumina pellets as in Example 1 were immersed in an aqueous solution of silver nitrate to carry 5 weight % (on a metal basis) of silver nitrate. Thereafter, they were dried, heated and burned in the same manner as in Example 1 except for the burning temperature of 300° C. to produce an exhaust gas cleaner comprising fine silver or silver oxides having an average diameter of less than 5 nm.

3.75 g of the resultant exhaust gas cleaner was set in a reactor pipe, and the same procedures as in Example 1 were conducted to measure the removal ratio of nitrogen oxides by using a test gas having a composition shown in Table 1. The results are shown in FIG. 1.

As is clear from FIG. 1, the nitrogen oxides were well removed in a wide temperature range in Examples 1 and 2 in which the silver component had an average diameter of 45–50 nm. On the other hand, the removal ratio of nitrogen oxides was low in an entire temperature range measured in Comparative Example 1 in which the silver component had an average diameter of less than 10 nm.

EXAMPLE 3

5 g of commercially available γ-alumina pellets (diameter: 30 mm, length: 6 mm, specific surface area: 200 m²/g) were impregnated with 5 weight % (on a metal basis) of silver nitrate, dried at 80° C. for 2 hours, heated to 600° C. stepwise, and burned at 600° C. for 5 hours in an air stream to produce an exhaust gas cleaner comprising fine silver or silver oxides having an average diameter of 45 nm. The diameters of fine silver or silver oxides were measured by an electron microscope.

Figure 2:
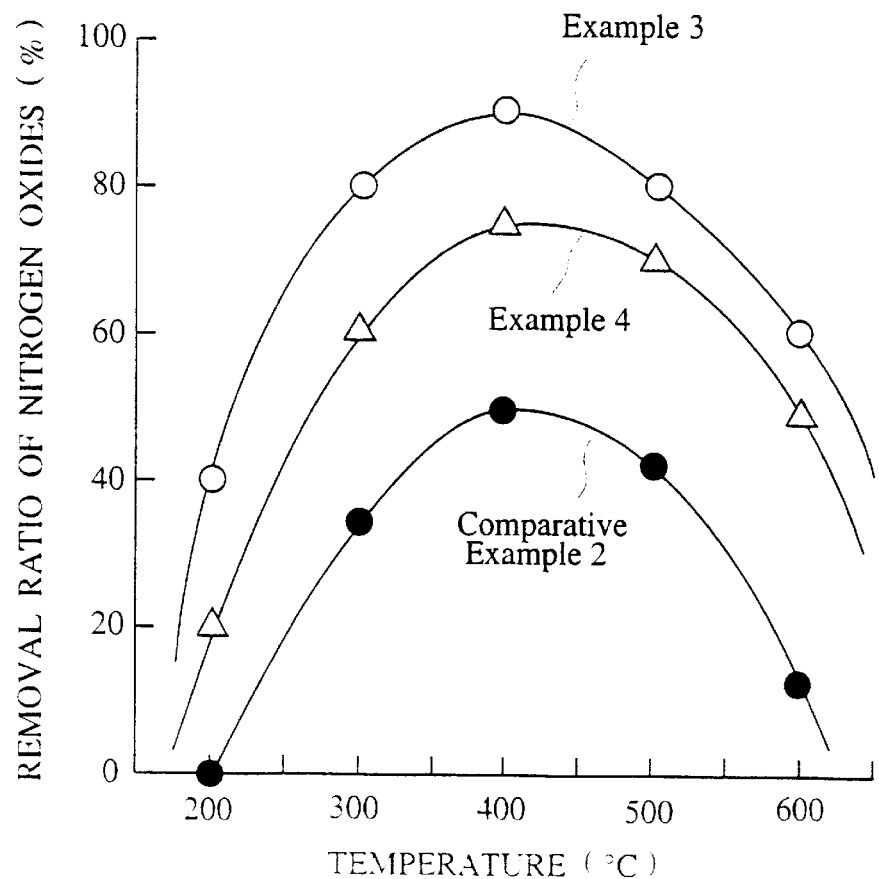
FIG. 2 is a graph showing the relation between the removal ratio of nitrogen oxides and the temperature of the exhaust gas in Example 3 and 4, and Comparative Example 2.

3.7 g of the resultant exhaust gas cleaner was set in a reactor pipe, and a test gas having a composition shown in Table 3 was caused to pass through the reactor pipe at a rate of 4.4 liters (standard conditions) per minute, which corresponded to a catalyst ratio of 0.05 sec·g/ml and a space velocity of 30,000 h⁻¹. The temperature of the test gas in the reactor pipe was changed from 200° C. to 600° C. to cause a reaction of nitrogen oxides with ethanol. The results are shown in FIG. 2.

TABLE 3

| Component | Concentration |
| --- | --- |
| Nitrogen monoxide | 800 ppm |
| Carbon monoxide | 100 ppm |
| Oxygen | 10 volume % |
| Ethanol | 3 times the weight of NO |
| Nitrogen | Balance |
| Water | 10 volume % based on the total of the above components. |

EXAMPLE 4

γ-Alumina powder (specific surface area: 200 m²/g) was immersed in an aqueous solution of silver nitrate to carry 5 weight % of silver, and 1.0 g of the resulting catalyst was supported on a commercially available honeycomb-type cordierite filter (diameter: 30 mm, length: 12.6 mm, 400 cells/in²). Thereafter, it was dried, heated and burned in the same manner as in Example 1 to produce an exhaust gas cleaner comprising fine silver or silver oxides having an average diameter of 50 nm.

The resultant exhaust gas cleaner was set in a reactor pipe, and the same procedures as in Example 3 were conducted to measure the removal ratio of nitrogen oxides. The results are shown in FIG. 2.

Comparative Example 2

10 g of the same γ-alumina pellets as in Example 3 were immersed in an aqueous solution of silver nitrate to carry 5 weight % (on a metal basis) of silver, dried, heated and burned in the same manner as in Example 3. They were then heat-treated at 750° C. for 5 hours in an air stream to produce an exhaust gas cleaner comprising silver or silver oxides having as large an average diameter as 2,000 nm.

3.6 g of the resultant exhaust gas cleaner was set in a reactor pipe, and the same procedures as in Example 3 were conducted to measure the removal ratio of nitrogen oxides. The results are shown in FIG. 2.

As is clear from FIG. 2, the nitrogen oxides were well removed in a wide temperature range in Examples 3 and 4 in which the silver component had an average diameter of 45–50 nm. On the other hand, the removal ratio of nitrogen oxides was low in an entire temperature range measured in Comparative Example 2 in which the silver component had an average diameter of more than 1,000 nm.

EXAMPLE 5

10 g of commercially available γ-alumina pellets (diameter: 1.5 mm, length: 6 mm, specific surface area: 260 m²/g) were immersed in an aqueous solution of 0.61 g of silver sulfate in 20 ml of 2.5M nitric acid for 20 minutes. Thereafter, they were dried at 80° C. for 2 hours in an air stream, heated at a temperature elevating at 2.5° C./min up to 550° C., and burned at 550° C. for 5 hours in a nitrogen stream containing 10% of oxygen to carry 2.0 weight % (on a metal basis) of silver sulfate with the γ-alumina pellets.

The resultant exhaust gas cleaner was set in a reactor pipe, and a test gas having a composition shown in Table 4 below was caused to pass through the reactor pipe at a rate of 2 liters (standard conditions) per minute, which corresponded to a catalyst ratio of 0.3 sec·g/ml and a space velocity of 6,400 h⁻¹. The temperature of the test gas in the reactor pipe was changed from 300° C. to 550° C. to cause a reaction of nitrogen oxides with propylene, and the removal ratio of nitrogen oxides was determined in the same manner as in Example 1. The results are shown in Table 5.

TABLE 4

| Component | Concentration |
| --- | --- |
| Nitrogen monoxide | 500 ppm |
| Carbon dioxide | 10 volume % |
| Oxygen | 10 volume % |
| Propylene | 500 ppm |
| Nitrogen | Balance |
| Water | 10 volume % based on the total of the above components. |

EXAMPLE 6

10 g of the same commercially available γ-alumina pellets as in Example 5 were immersed in 20 ml of 9.7 mM sulfuric acid for 20 minutes. Thereafter, they were dried, heated and burned in the same manner as in Example 5, and then cooled to room temperature in a nitrogen stream containing 10% of oxygen.

They were then immersed in an aqueous solution of 0.67 g of silver nitrate in 20 ml of water for 20 minutes. Thereafter, they were dried at 80° C. for 2 hours in an air stream, heated at a temperature elevating at 2.5° C./min up to 550° C., and burned at 550° C. for 5 hours in a nitrogen stream containing 10% of oxygen to produce an exhaust gas cleaner carrying 2 weight % (on a metal basis) of silver and 0.09 weight % of sulfuric acid based on the γ-alumina pellets.

The resultant exhaust gas cleaner was set in a reactor pipe, and the same procedures as in Example 5 were conducted to measure the removal ratio of nitrogen oxides in the same manner as in Example 5. The results are shown in Table 5.

EXAMPLE 7

10 g of the same commercially available γ-alumina pellets as in Example 5 were immersed in an aqueous solution of 0.67 g of silver nitrate in 20 ml of water for 20 minutes. Thereafter, they were dried at 80° C. for 2 hours in an air stream, heated at a temperature elevating at 2.5° C./min up to 550° C., and burned at 550° C. for 5 hours in a nitrogen stream containing 10% of oxygen, and then cooled to room temperature in a nitrogen stream containing 10% of oxygen.

The silver-impregnated γ-alumina pellets were then immersed in 20 ml of 9.7 mM sulfuric acid for 20 minutes, dried at 80° C. for 2 hours in an air stream, heated at a temperature elevating at 2.5° C./min up to 550° C., and burned at 550° C. for 5 hours in a nitrogen stream containing 10% of oxygen to produce an exhaust gas cleaner carrying 2 weight % (on a metal basis) of silver and 0.09 weight % of sulfuric acid on the γ-alumina pellets.

The resultant exhaust gas cleaner was set in a reactor pipe, and the same procedures as in Example 5 were conducted to measure the removal ratio of nitrogen oxides. The results are shown in Table 5.

Comparative Example 3

The same γ-alumina pellets as in Example 5 were immersed in an aqueous solution of silver nitrate to carry 2.0 weight % (on a metal basis) of silver nitrate, dried, heated and burned in the same manner as in Example 5 except for the burning temperature of 600° C. to produce an exhaust gas cleaner comprising silver. Thereafter, they were exposed to sunshine for 1 hour to cause photo-reduction of the silver carried by alumina.

The resultant exhaust gas cleaner was set in a reactor pipe, and the same procedures as in Example 5 were conducted to measure the removal ratio of nitrogen oxides. The results are shown in Table 5.

TABLE 5

| | Removal ratio of Nitrogen Oxides (%) | | | |
| --- | --- | --- | --- | --- |
| Temp. (°C.) | Ex. 5 | Ex. 6 | Ex. 7 | Com. Ex. 3 |
| 300 | 11.8 | 11.0 | 10.5 | 0.0 |
| 350 | 33.9 | 30.5 | 28.0 | 2.0 |
| 400 | 59.5 | 45.8 | 40.5 | 17.2 |
| 450 | 67.8 | 60.5 | 63.3 | 57.3 |
| 500 | 57.7 | 56.7 | 60.5 | 56.7 |
| 550 | 22.9 | 30.2 | 27.6 | 37.8 |

As is clear from Table 5, the exhaust gas cleaners of Examples 5–7 can considerably remove nitrogen oxides even at as low a temperature as 400° C. or lower. On the other hand, the removal ratio of nitrogen oxides was low in a low-temperature comparative Example 3.

EXAMPLE 8

10 g of commercially available γ-alumina pellets (diameter: 1.5 mm, length: 6 mm, specific surface area: 260 m²/g) were immersed in an aqueous solution of 0.67 g of silver nitrate in 20 ml of water for 20 minutes, then dried at 80° C. for 2 hours in an air stream and at 180° C. for 2 hours in a dry nitrogen stream, and cooled to room temperature in a dry nitrogen stream to carry silver nitrate. Thereafter, they were immersed in an aqueous solution of 0.5 g of ammonium chloride in 20 ml of water for 12 hours to convert silver nitrate into silver chloride. Thereafter, they were dried at 80° C. for 2 hours in an air stream, heated at a temperature elevating at 2.5° C./min up to 550° C. in a nitrogen stream containing 10% of oxygen, and burned at 550° C. for 5 hours to carry 2.1 weight % (on a metal basis) of silver chloride.

The resultant exhaust gas cleaners was exposed to sunshine for 1 hour and then set in a reactor pipe. A test gas having a composition shown in Table 4 above was caused to pass through the reactor pipe at a rate of 2 liters (standard conditions) per minute, which corresponded to a catalyst ratio of 0.3 sec·g/ml and a space velocity of 6,400 h⁻¹. The temperature of the test gas in the reactor pipe was changed from 300° C. to 550° C. to cause a reaction of nitrogen oxides with propylene.

The concentration of nitrogen oxides (sum of nitrogen monoxide and nitrogen dioxide) in the test gas after passing through the exhaust gas cleaner was measured by a chemiluminescence-based NO/NOx analyzer to determine the removal ratio of nitrogen oxides. The results are shown in Table 7.

EXAMPLE 9

0.4 g of silver chloride was suspended in 200 g of an alumina sol (CATALOID® AS-3 available from Catalysts & Chemicals Industries Co., Ltd.), and stirred on a water bath to evaporate water to half dryness. The half-dried mixture was molded into pellets, dried at 110° C. for 2 hours in an air stream, and heated at 200° C. for 2 hours, at 300° C. for 2 hours, at 400° C. for 2 hours and at 550° C. for 5 hours in a nitrogen stream containing 10% oxygen to carry 2.1 weight % (on a metal basis) of silver chloride with the alumina. Dimensions of the resulting pellets were 1–2 mm in diameter and 2–3 mm in length.

The exhaust gas cleaner thus produced was exposed to sunshine for 1 hour and then set in a reactor pipe. A test gas having a composition shown in Table 4 above was caused to pass through the reactor pipe at a rate of 2 liters (standard conditions) per minute, which corresponded to a catalyst ratio of 0.3 sec·g/ml and a space velocity of 6,400 h$^{-1}$. The temperature of the test gas in the reactor pipe was changed from 300° C. to 550° C. to cause a reaction of nitrogen oxides with propylene.

The concentration of nitrogen oxides (sum of nitrogen monoxide and nitrogen dioxide) in the test gas after passing through the exhaust gas cleaner was measured by a chemiluminescence-based NO/NOx analyzer to determine the removal ratio of nitrogen oxides. The results are shown in Table 7.

EXAMPLE 10

10 g of commercially available γ-alumina pellets (diameter: 1.5 mm, length: 6 mm, specific surface area: 260 m$^2$/g) were immersed in an aqueous solution of 0.67 g of silver nitrate in 20 ml of water for 20 minutes, then dried at 80° C. for 2 hours in an air stream and at 180° C. for 2 hours in a dry nitrogen stream, and cooled to room temperature in a dry nitrogen stream to carry silver nitrate. Thereafter, they were immersed in an aqueous solution of 0.5 g of ammonium chloride in 20 ml of water for 12 hours to convert silver nitrate into silver chloride. Thereafter, they were dried at 80° C. for 2 hours in an air stream, heated at a temperature elevating at 2.5° C./min up to 550° C. in a nitrogen stream containing 10% of oxygen, and burned at 550° C. for 5 hours to carry 2.1 weight % (on a metal basis) of silver chloride.

1.67 g of the resultant exhaust gas cleaners was set in a reactor pipe. A test gas having a composition shown in Table 6 below was caused to pass through the reactor pipe at a rate of 2 liters (standard conditions) per minute, which corresponded to a catalyst ratio of 0.05 sec·g/ml and a space velocity of 38,400 h$^{-1}$. The temperature of the test gas in the reactor pipe was changed from 300° C. to 550° C. to cause a reaction of nitrogen oxides with propylene.

The concentration of nitrogen oxides (sum of nitrogen monoxide and nitrogen dioxide) in the test gas after passing through the exhaust gas cleaner was measured by a chemiluminescence-based NO/NOx analyzer to determine the removal ratio of nitrogen oxides. The results are shown in Table 7.

TABLE 6

| Component | Concentration |
| --- | --- |
| Nitrogen monoxide | 1000 ppm |
| Oxygen | 10 volume % |
| Ethanol | 1250 ppm |
| Nitrogen | Balance |
| Water | 10 volume % based on the total of the above components. |

EXAMPLE 11

The same exhaust gas cleaner as in Example 8 was set in a reactor pipe, and the same procedures as in Example 10 were conducted to measure the removal ratio of nitrogen oxides. The results are shown in Table 7.

Comparative Example 4

The same γ-alumina pellets as in Example 8 were immersed in an aqueous solution of silver nitrate to carry 2.0 weight % (on a metal basis) of silver, dried, and heated in the same manner as in Example 8. Thereafter, they were exposed to sunshine for 1 hour to cause photo-reduction of the silver carried by alumina. The removal test of nitrogen oxides was conducted in the same manner as in Example 8. The results are shown in Table 7.

TABLE 7

| | Removal ratio of Nitrogen Oxides (%) | | | | |
| --- | --- | --- | --- | --- | --- |
| Temp. (°C.) | Ex. 8 | Ex. 9 | Ex. 10 | Ex. 11 | Com. Ex. 4 |
| 300 | 0.0 | 0.0 | 79.0 | 78.0 | 0.0 |
| 350 | 5.8 | 5.0 | 91.3 | 90.8 | 2.0 |
| 400 | 27.5 | 25.8 | 92.3 | 92.0 | 10.4 |
| 450 | 63.3 | 60.5 | 86.2 | 87.0 | 43.2 |
| 500 | 60.5 | 57.7 | 72.9 | 73.0 | 45.0 |
| 550 | 27.6 | 22.9 | 50.3 | 51.0 | 10.5 |

As is clear from Table 7, the exhaust gas cleaners of Examples 8 and 9 having silver chloride can well remove nitrogen oxides at a temperature of 400°–550° C. In addition, in Examples 10 and 11 where ethanol was added, the removal ratio of nitrogen oxides was considerably high over the entire temperature range from 300° C. to 550° C. On the other hand, the removal ratio of nitrogen oxides was low in an entire temperature range in Comparative Example 4 having photo-reduced silver.

As is described above in detail, by the exhaust gas cleaner according to the present invention, nitrogen oxides can be efficiently removed from the exhaust gas having an excess oxygen concentration in a wide temperature range. The exhaust gas cleaner and the method of the present invention are effective for removing nitrogen oxides from exhaust gases such as those discharged from various combustors, automobile engines, etc.

What is claimed is:

1. A method for removing nitrogen oxides from an exhaust gas containing nitrogen oxides and oxygen in an amount larger than its stoichiometric amount relative to unburned components in said exhaust gas, which comprises:
    (i) disposing an exhaust gas cleaner in a flow path of said exhaust gas, said exhaust gas cleaner consisting essentially of a catalyst component consisting essentially of silver or silver oxides, each of said silver and silver oxides having an average diameter of 10–1,000 nm and being supported on a porous inorganic oxide selected from the groups consisting of alumina, silica, titania. zirconia, alumina-titania, alumina-silica and alumina-zirconia, said silver and silver oxides being present in said gas cleaner in an amount of 0.2 to 15 weight % on a metal basis and said porous inorganic oxide having a specific surface area of 10 $m^2$/g or more;

(ii) introducing a reductant selected from the group consisting of propane, propylene, acetylene, diesel oil, cetane, heptane, kerosene, alcohols having 2 or more carbon atoms and a mixture thereof into said exhaust gas on the upstream side of said exhaust gas cleaner in an amount 0.1–5 times the weight of said nitrogen oxides in said exhaust gas; and (iii) bringing said exhaust gas into contact with said exhaust gas cleaner at a temperature of 200°–600° C., thereby causing a reaction of said nitrogen oxides with said reductant to remove said nitrogen oxides.

2. The method for removing nitrogen oxides according to claim 1, wherein each of said silver and silver oxides has an average diameter of 20–100 nm, and hydrocarbons are introduced.

3. The method for removing nitrogen oxides according to claim 1, wherein said exhaust gas cleaner further comprises a three-dimensional structure of ceramics or metal on which said porous inorganic oxide is coated.

* * * * *